United States Patent
Pratt et al.

[11] Patent Number: 5,835,153
[45] Date of Patent: Nov. 10, 1998

[54] SOFTWARE TELETEXT DECODER ARCHITECTURE

[75] Inventors: Kyle Anthony Pratt, Allen; Frank Xu, Irving, both of Tex.

[73] Assignee: Cirrus Logic, Inc., Fremont, Calif.

[21] Appl. No.: 579,070

[22] Filed: Dec. 22, 1995

[51] Int. Cl.⁶ ............................... H04N 7/00; H04N 11/00
[52] U.S. Cl. ............................ 348/468; 348/461
[58] Field of Search .................. 848/726, 552, 848/605, 727, 563, 569, 468, 461; 348/461; H04N 7/10

[56] References Cited

U.S. PATENT DOCUMENTS

| | | | |
|---|---|---|---|
| 4,894,789 | 1/1990 | Yee | 364/521 |
| 4,908,706 | 3/1990 | Bugg | 358/147 |
| 4,931,870 | 6/1990 | den Hollander | 358/142 |
| 5,237,411 | 8/1993 | Fink et al. | 358/146 |
| 5,249,164 | 9/1993 | Koz | 358/21 |
| 5,274,455 | 12/1993 | Nishide et al. | 358/188 |
| 5,359,367 | 10/1994 | Stockhill | 348/552 |
| 5,386,238 | 1/1995 | Kinghorn et al. | 348/468 |
| 5,396,546 | 3/1995 | Remillard | 379/96 |
| 5,453,794 | 9/1995 | Ezaki | 348/461 |
| 5,537,151 | 7/1996 | Orr et al. | 348/564 |
| 5,657,088 | 8/1997 | Hankinson | 348/465 |
| 5,666,548 | 9/1997 | Grimm et al. | 348/589 |
| 5,694,163 | 12/1997 | Harrison | 348/13 |

*Primary Examiner*—Michael Lee
*Attorney, Agent, or Firm*—David H. Tannenbaum; Steven A. Shaw

[57] ABSTRACT

An apparatus for capturing and decoding the teletext data from a television signal and displaying the teletext data, along with the video picture, in a windowing environment on the monitor of a personal computer system. The teletext data decoder retrieves the lines of teletext data stored in the frame buffer with the rest of the video frames, decodes the teletext data in software and stores the teletext characters directly in system memory for further processing and display in user-defined windows on the PC monitor.

27 Claims, 2 Drawing Sheets

SOFTWARE TELETEXT DECODER ARCHITECTURE

TECHNICAL FIELD OF THE INVENTION

This invention pertains to a system and method for viewing teletext information on the monitor of a computer screen and, in particular, to a video processing system for capturing teletext data encoded in particular lines of a television signal and displaying the teletext data in user-defined windows of a PC screen.

BACKGROUND OF THE INVENTION

As the number and type of multimedia applications for personal computers (PCs) continue to expand, both the need to and the capability to view television signals derived from broadcast, cable or video cassette signals in a window on the screen of a PC are becoming increasingly commonplace. In Europe, in addition to the conventional entertainment video broadcast in the television signal, a second information signal known as teletext is often broadcast as well. The broadcast teletext information contains popular public information services, such as stock reports, weather reports, educational information services, or virtually any other textual or graphical data packet desired.

In a conventional TV set, teletext information is decoded from the broadcast video signal with the use of dedicated hardware that processes the data and displays it on the TV screen. In a teletext capable PC, this same dedicated teletext hardware is used to extract and process the teletext information from the video stream and then store it until the processed teletext information is sent to the host computer. The host computer then runs a software application that receives the processed data and formats it for display on the computer screen.

Currently, many PC-TV products allow a user to view TV on a computer monitor. Some products allow information to be viewed with the addition of appropriate hardware, typically a module that plugs into the TV card. Typically, a TV tuner receives a signal from either an antenna or cable connection. The selected channel is output from the tuner to the TV decoder chip and to the teletext decoder chip.

The video decoder chip converts the analog signal coming from the tuner into a digital video standard, such as CCIR 601 or one of its variants. In such a system, the entire original signal is still present, but it has been converted from analog to digital form. The lines of the video signal that contain viewable data (lines 23–310 in a single field) are then stripped out of the video stream and stored in a frame buffer. This frame buffer may be shared with the graphics controller or may be a separate buffer. The viewable video data is then merged with the graphics data and displayed on the monitor.

The teletext decoder chip also samples the analog signal coming from the tuner. However, the teletext decoder is only interested in sampling lines 7–22 of each field, since this is the location of the teletext information in the video stream. Teletext information is presented to the user in pages. Each page of teletext information is broadcast about every 20 seconds. The teletext decoder processes the appropriate lines from the video stream in order to decode a page of information and then stores the decoded information in a dedicated teletext memory.

The amount of teletext memory available determines the number of pages that can be stored at any given time. Storing multiple pages eliminates the need for the user to wait for 20 seconds while a newly selected page is rebroadcast. Once a page has been decoded and stored in the teletext memory, a software application running on the CPU can retrieve the processed page from the teletext decoder and format the processed page for display on the monitor. This is accomplished by writing the formatted teletext page into the graphics controller's frame buffer.

This approach has been proven to work yet adds additional system cost for the teletext decoder chip, the teletext memory, and any additional hardware needed to interface the decoder to the system bus of the CPU.

There is therefore a need for systems and methods for decoding teletext data in a television signal that eliminate dedicated teletext hardware. There is a still further need for systems and methods for decoding teletext data using a combination of existing video processing hardware and software techniques that capture and process the teletext information prior to sending the processed data to the software application which formats and displays the teletext on the computer screen.

SUMMARY OF THE INVENTION

The above and other needs are met by a software teletext decoder executing on a computer system. The digital data coming out of the video decoder contains the entire analog signal in digital form. Thus, both the viewable video and the unprocessed teletext information are available at the output of the video decoder. The video decoder's output, including the raw teletext data, is stored in a graphics frame buffer accessable by the central processing unit (CPU). Software executing on the CPU is operable to extract the raw teletext data from the frame buffer, process the data into a page of teletext information, and store the page in system memory. Then, the computer system can display the teletext page on a computer screen by retrieving the teletext information from the system memory.

A technical advantage of the present invention is the elimination of dedicated teletext hardware. By performing the teletext decoding in software, hardware costs and complexity are reduced.

Another technical advantage of the present invention is that teletext decoding can be performed with existing computer hardware. One does not need to purchase additional computer hardware to decode teletext signals.

Yet another technical advantage of the present invention is improved flexibility in teletext signal decoding. Because the decoding is performed in software, rather than hardware, changes in the decoding system and method can be quickly tested and implemented.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

Figure 1:
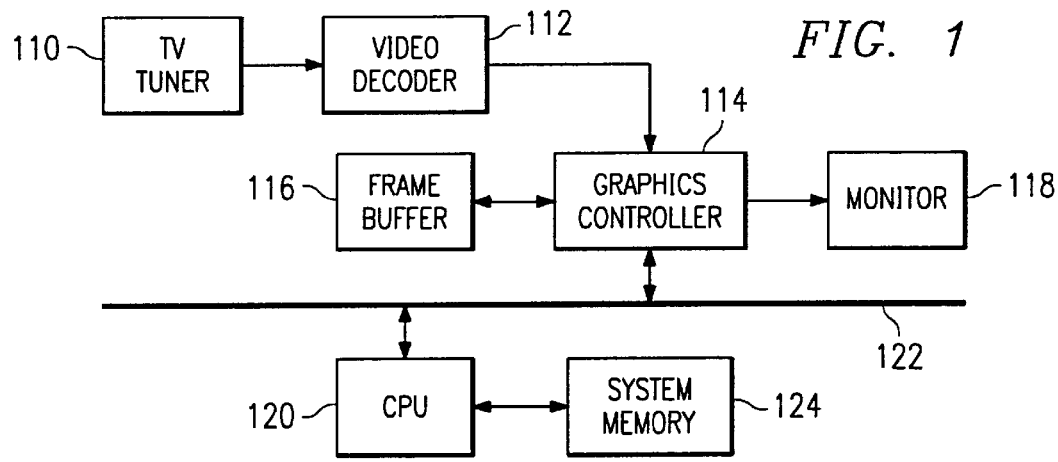
FIG. 1 is a block diagram of hardware operable to execute a teletext decoder in accordance with the present invention.

FIG. 1 illustrates a functional block diagram of a computer system operable to execute a teletext decoder according to the present invention. Shown are television (TV) tuner 110, video decoder 112, graphics controller 114, frame buffer 116, monitor 118, central processing unit (CPU) 120, bus 122, and system memory 124.

TV tuner 110 receives a TV signal from an antenna, cable, or other broadcasting means. Video decoder 112 converts the TV signal into a digital video signal such as CCIR 601 or one of the signal's variants. The exact format of the digital signal is not important, as long as the digital signal contains all of the information present in the analog signal.

The digital signal is stored in frame buffer 116 via graphics controller 114. The digital signal comprises a component representing the video signal and another component representing the raw teletext information. Once the digital signal is in frame buffer 116, graphics controller 114 can access the part of the signal representing the video signal and display it on monitor 118.

A computer program executing on CPU 120 can access the digital signal within frame buffer 116 via system bus 122. The program is operable to extract the raw teletext data from graphics frame buffer 116, process the data into a page of teletext information, and store the page in system memory 124. Then, conventional software can retrieve the teletext information from system memory 124 and display the information on monitor 118. The below discussion centers on the operation of the computer program executing on CPU 120.

Software Teletext Decoder (STD)

Figure 2:
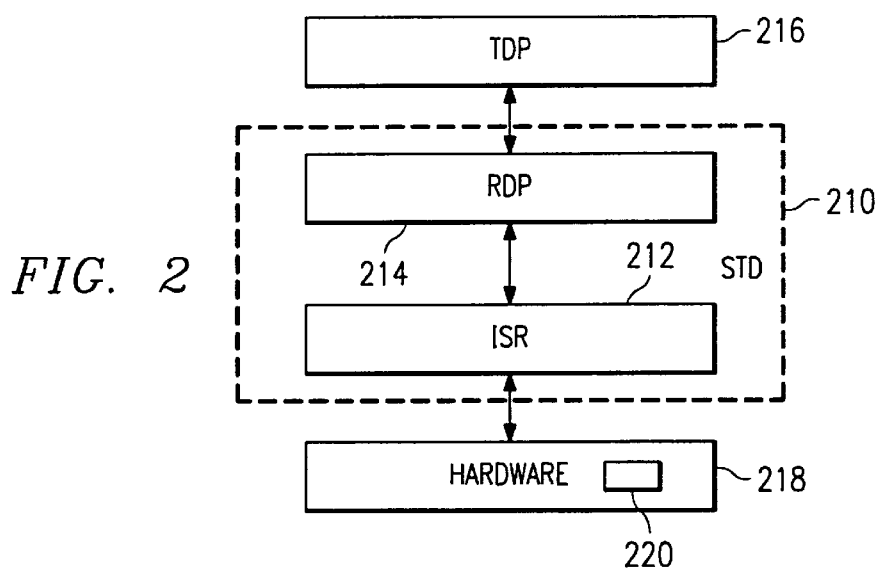
FIG. 2 is an architectural block diagram of a teletext decoder in accordance with the present invention.

FIG. 2 is an architectural block diagram of a teletext decoder in accordance with the present invention. The Software Teletext Decoder (STD) 210 is comprised of two software modules: Interrupt Service Routine (ISR) 212 and Raw Data Processor (RDP) 214. These two modules 212, 214 provide the means of retrieving the unprocessed teletext data from frame buffer 116 and processing the data into a format that the Teletext Display Processor (TDP) 216 application can interpret and display on the computer screen. ISR 212 is the lowest level of code and is responsible for extracting the teletext data from frame buffer 116 and storing it in a temporary buffer in System Memory 124. RDP 214 resides between ISR 212 and TDP 216 and is the module that actually decodes the new data into pages of characters and control codes that TDP 216 can use to format the data for display on the monitor.

The Interrupt Service Routine (ISR)

Figure 3:
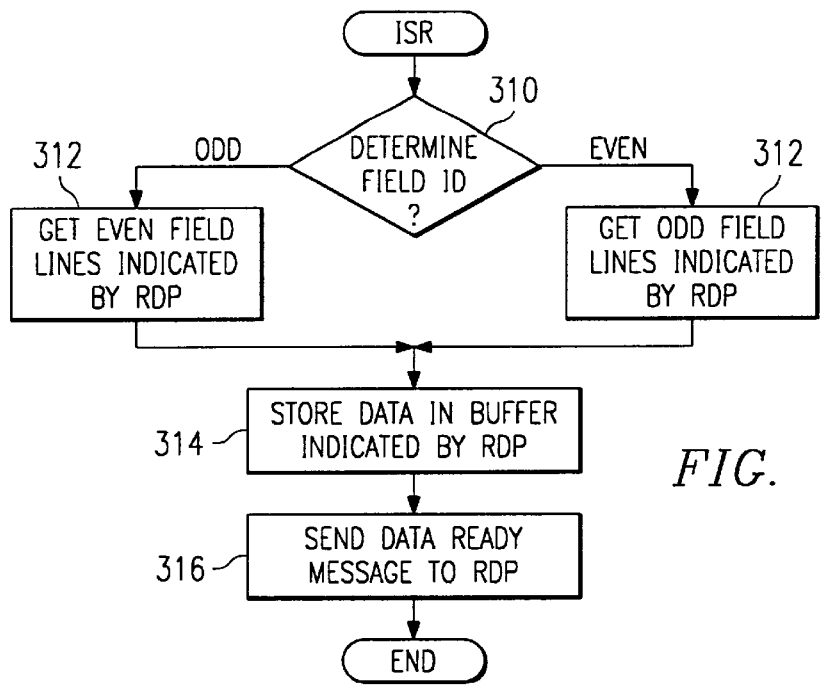
FIG. 3 is a flow diagram of an interrupt service routine in accordance with the present invention.

FIG. 3 is a flow diagram of an interrupt service routine in accordance with the present invention. As mentioned above, ISR 212 is responsible for transferring the raw teletext data to System Memory 124 for processing by RDP 214. In order to accomplish this, ISR 212 needs three pieces of information:

1) Which field of the video stream is currently being input to hardware 218;
2) Which lines contain the teletext information; and
3) Where to put the data that is being sent to RDP 214.

ISR 212 retrieves the field ID from hardware 218. The latter two parameters are sent to ISR 212 by RDP 216.

The vertical sync of the incoming video stream, along with other timing signals, is used by hardware 218 to determine the ID of the current video field. The field ID is stored in a register 220 in hardware 218 that ISR 212 can read (Step 310). The vertical sync is also used to generate an interrupt to CPU 120. When this interrupt is generated it causes ISR 212 to execute and is an indication that there is new data in frame buffer 116 to be retrieved.

Teletext information is present on both fields of the video stream. The teletext lines from odd numbered fields are stored in one section of frame buffer 116 while the teletext lines from even fields are stored in a second section of frame buffer 116. ISR 212 determines the ID of the current video field (Step 310) and transfers the appropriate lines of the opposite field to RDP 214 (Step 312). The data from the current field is not used since it is being updated at the same time ISR 212 is trying to transfer the data to RDP 214.

The teletext information may be on any or all of the 16 designated lines (lines 7–22). In an effort to minimize the amount of data that is transferred to System Memory 124, RDP 214 will indicate to ISR 212 which lines actually contain valid data. This is accomplished by having RDP 214 tell ISR 212 to send all lines (lines 7–22) when the application is first invoked. RDP 214 will then pace the lines and see which lines will contain valid teletext data. Once RDP 214 has determined which lines contain valid data, ISR 212 can be instructed to transmit only the necessary lines. The lines containing data will not change until the user selects a different channel. RDP 214 is aware of this event and can re-examine the lines when it occurs.

RDP 214 also passes a pointer to a buffer in System Memory 124 that indicates to ISR 212 where to put the new teletext data. Once ISR 212 has transferred the data to System Memory 124 (Step 314), it sends a message to RDP 214 indicating that the data transfer is complete (Step 316).

The Raw Data Processor (RDP)

Figure 4:
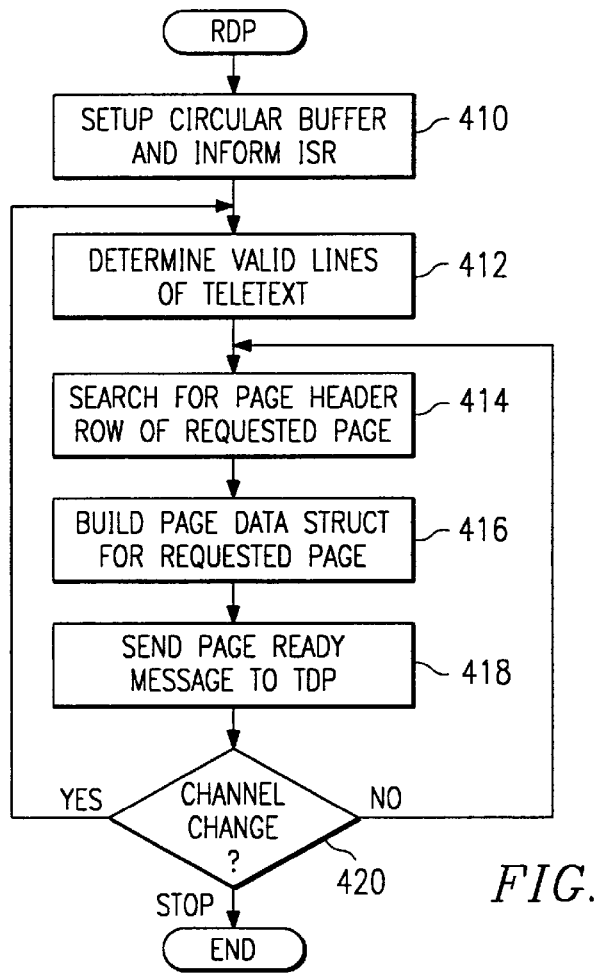
FIG. 4 is a flow diagram of a raw data processing routine in accordance with the present invention.

FIG. 4 is a flow chart illustrating the behavior of RDP 214. At step 410, RDP 214 sets up a circular buffer and passes the buffer's address and other information to ISR 212. Next, at step 412, RDP 214 parses the teletext information received from ISR 212 to determine which lines are valid. At step 414, RDP 214 searches for a Page Header Row of a requested page. At step 416, RDP 214 builds a page data structure for the requested page. At step 418, RDP 214 sends a page ready message to TDP 216. Whenever the channel is changed, RDP 214 returns to step 412 (step 420). Each of these steps is discussed in detail below.

The Circular Buffer

RDP 214 maintains the raw teletext data in what is known as a circular buffer. This is nothing more than a block of memory with some number (N) of entry points. At the start of the application, RDP 214 will pass a pointer to the starting address of the circular buffer along with the size and number of entries in the buffer to ISR 212 (Step 410). Each time ISR 212 needs to send data to RDP 214 (once every vertical sync), ISR 212 will increment what is known as the write index entry point into the circular buffer. ISR 212 then transfers the data to the new entry point in memory and tells RDP 214 that it is there by sending a Data Ready message. RDP 214 increments what is known as the read index entry point upon receiving this message. This read index is used by RDP 214 to determine which entry in the circular buffer contains the new data to be processed. After ISR 212 has filled all N entries in the circular buffer, the first entry will then be used for the next packet of data sent by ISR 212.

The size of each entry in the circular buffer is dependent on the number of lines of video that actually contain teletext data. The teletext specification permits data to be present on lines 7–22 of each field of the video stream. However, a teletext broadcast may contain data on any or all of these lines. When the teletext application is invoked, RDP 214 will tell ISR 212 to send all 16 lines of information. RDP 214 can then determine which of the 16 lines contain actual teletext information (Step 412). Once the valid teletext lines have been determined, RDP 214 will instruct ISR 212 to send only those lines.

The teletext specification states that each teletext line contains 45 bytes of information. This equates to 360 (45×8) bits of teletext on each teletext line. Each bit of teletext is represented by a single byte of video luminance data. In order to correctly decode this data it must be at least 2× over sampled. This means that at least 720 (360×2) bytes of luminance information is stored in the graphics frame buffer. If RDP 214 determines that the teletext broadcast contains four lines of valid data and wants to have 10 entries in the circular buffer, this equates to 10 entries×4 lines/entry×720 bytes/line=28800 bytes of System Memory 124 to create the circular buffer.

The Pave Data Structure

The teletext specification specifies that teletext information is displayed in a page format where each page consists of 24 rows of 40 characters. Each line of raw teletext data contains the row number for the data contained in that line. There are actually more than 24 rows of teletext information broadcast for each page of teletext data. The line of teletext data that contains a row number of 0 is known as the Page Header Row. The information in the Page Header Row contains the page number, special control codes for the following rows of teletext information, and 32 displayable characters. The teletext lines that contain row numbers 1–25 contain the 40 characters of displayable information that make up the page. The teletext lines that contain the row numbers 26–28 contain additional non-displayable control codes for the previous 24 lines of teletext data. Teletext lines that contain row number 29 contain control codes for all pages within a teletext magazine. Teletext lines that contain row numbers 30 or 31 contain control codes for all teletext pages.

At the start of the teletext application, RDP 214 is told by the TDP 216 which page of teletext information the user desires to view. RDP 214 then determines which lines of video contain valid teletext information as described above and sets up the circular buffer. Each time ISR 212 sends a message to RDP 214 indicating the next teletext data has been placed in the circular buffer, RDP 214 will search the raw data for a line that contains the Page Header Row with a page number that matches the desired page of viewing (Step 414). Once the correct Page Header Row has been found, RDP 214 will process the raw data for each row of the page and build a data structure that contains all of the displayable characters and control codes for the given page of teletext (Step 416). Upon completing the update of the page data structure, it is sent to TDP 216 (Step 418).

Synchronizing to the Data

Figure 5:
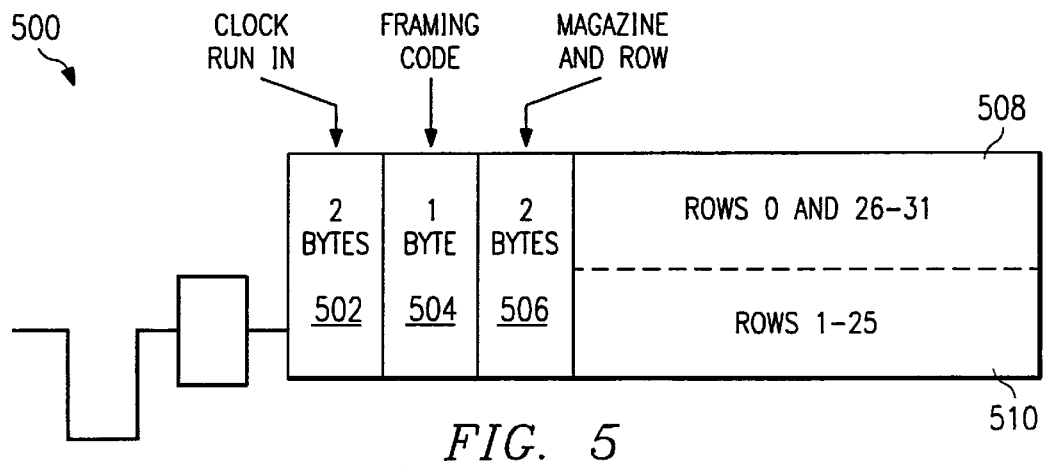
FIG. 5 is a diagram of a sample line of teletext data from a standard video frame.

In order to convert the raw teletext data into a format that can be placed into the page data structure, RDP 214 must synchronize to the data in each line. FIG. 5 illustrates a line of raw teletext data 500. Every line of raw teletext data contains what is known as a "clock run in" 502. This series of 8 high and 8 low alternating bits is the information that tells RDP 214 how to extract the rest of the data on the line.

In order to correctly extract the data, RDP 214 must determine a sampling threshold, the frequency of the clock run in and the phase of the clock run in. The first 16 bits of raw data are examined to determine the maximum high value and the minimum low value. These two values are then averaged and used as the sampling threshold. Any sample above the threshold is considered a high bit and any sample below the threshold is considered a low bit. Once the threshold has been calculated, RDP 214 must then determine the frequency of the clock run in (distance between high bits) and the phase of the clock run in (which sample actually contains the highest value). If the raw teletext data is 2× over sampled, then the 360 bits of teletext information are represented by 720 bytes of raw data. This implies that clock frequency is 1 high bit every 2 samples. By examining the first 4 bytes of raw data, the highest value can be found since two samples will be high bits and two samples will be low bits. Once the highest value has been found, the phase of the clock run in has been determined. Using the highest value as the first bit of teletext allows RDP 214 to extract the remaining 359 bits of information by simply collecting every other sample. Note that in a noisy signal, a more sophisticated data extraction algorithm may be used.

Verifying the Data

Once RDP 214 has synchronized to the data, it needs to verify the integrity of the data. This is accomplished with three different techniques: 1) Frame code verification, 2) Hamming code verification, and 3) Data parity verification. If RDP 214 finds a failure on any of the three validation tests, the processing of that line of teletext is aborted.

Immediately following the clock run 502 in on every line of teletext is what is known as the Framing Code 504. The framing code is nothing more than 8 bits of data with a hexadecimal value of O×E4. RDP 214 will examine the framing code of each line it processes to ensure that the data is being decoded properly.

The 2 bytes of data 506 following frame code 504 (the magazine and row number) and the control characters on the Page Header Row 508 are encoded with Hamming codes. Hamming codes allow the correction of single bit errors and detection of double bit errors.

Finally, the teletext specification states that the displayable text character's 510 bytes are encoded with "odd" parity. This implies that the number of logic "1" data bits in a character and the parity bit must be odd. RDP 214 will ensure that all parity protected bytes have the correct parity.

Building the Page Data Structure

In order for RDP 214 to build the page data structure, it must first find the Page Header Row. Each line of teletext data that is placed in the circular buffer is examined until the Page Header Row for the desired page is found. After the integrity of this line of data has been verified, the serial data bits of the line are collected into the appropriate control character codes and placed into the page data structure.

All teletext lines following the Page Header Row are guaranteed by the teletext specification to contain data for the page specified in that Page Header Row. The receipt of a new Page Header Row is the termination of data for the previous page. Given this information, RDP 214 will process each new line of teletext placed into the circular buffer until a new Page Header Row is found. This processing includes testing the validity of the data, determining the row number for the line being processed, and converting the serial bit stream into text characters and control codes. Each line that is successfully processed is then placed in the page data structure entry for the row specified in that line.

Communicating with the TDP

When RDP 214 has determined that all of the rows of the desired page have been received, processed, and placed into the page data structure, it will indicate to TDP 216 that the page data structure is available for display processing.

RDP 214 actually maintains two copies of the page data structure, one that TDP 216 can work on and another than can be updated by RDP 214 with new page information. When RDP 214 indicates to TDP 216 that page data structure 1 is available, it will immediately start processing more raw data and placing it in page data structure 2. RDP 214 will continue to update page data structure 2 until TDP 216 indicates to RDP 214 that the display processing of page data structure 1 is complete. When TDP 216 has completed its processing of page data structure 1, RDP 214 will then finish updating page data structure 2, tell TDP 216 that page data structure 2 is available, and immediately begin updating page data structure 1 again.

Anytime during this processing cycle TDP 216 may indicate to RDP 214 that the user has selected a new page for viewing. When this occurs, RDP 214 will abort processing data for the current page and begin processing data for the new page.

The Teletext Display Processor (TDP)

TDP 216 is responsible for converting the control and text characters for a given page into a display on the computer screen. TDP 216 designs are well known in the art and the exact design of TDP 216 is not material to the present invention.

TDP 216 must be capable of receiving input from the user defining the desired page to be viewed. Because the teletext information is being displayed on a computer screen, TDP 216 should allow the user to change the size of the teletext window and thus the size of the displayed characters. By using additional system memory, TDP 216 can save multiple page data structures as they are viewed so that if a user decides to go back to a previously viewed page, the information can be displayed immediately while the STD collects the information to update that page. The fact that TDP 216 is running on a computer also opens up the possibility of generating transcripts by saving the viewed teletext pages into a file of printable characters.

Although the present invention and its advantages have been described in detail, it should be understood that various changes, substitutions and alterations can be made herein without departing from the spirit and scope of the invention as defined by the appended claims.

We claim:

1. A teletext decoder for processing raw teletext data stored in a frame buffer of a computer system having a main memory, comprising:

means for transferring the raw teletext data from the frame buffer to a specified location in the main memory; and a raw data processor, comprising:

means for specifying the specified location in the main memory;

means for placing the raw teletext data into a first data structure in the main memory; and means for processing the raw teletext data in the first data structure to produce teletext data in a second data structure in the main memory;

wherein the raw teletext data is stored in a plurality of fields in the frame buffer and wherein the means for transferring comprises:

means for determining a field ID identifying a first video field;

means for transferring the raw teletext data in a second video field opposite the first video field into the main memory; and means for sending the raw data processor a signal indicating that the transfer of the raw teletext data is complete.

2. A teletext decoder for processing raw teletext data stored in a frame buffer of a computer system having a main memory, comprising:

means for transferring the raw teletext data from the frame buffer to a specified location in the main memory; and a raw data processor, comprising:

means for specifying the specified location in the main memory;

means for placing the raw teletext data into a first data structure in the main memory; and means for processing the raw teletext data in the first data structure to produce teletext data in a second data structure in the main memory;

wherein the first data structure is a circular buffer.

3. A teletext decoder for processing raw teletext data stored in a frame buffer of a computer system having a main memory, comprising:

means for transferring the raw teletext data from the frame buffer to a specified location in the main memory; and a raw data processor, comprising:

means for specifying the specified location in the main memory;

means for placing the raw teletext data into a first data structure in the main memory; and means for processing the raw teletext data in the first data structure to produce teletext data in a second data structure in the main memory;

wherein the means for specifying further comprises:

means for setting up the first data structure in the main memory; and means for passing a pointer to the first data structure to the means for transferring.

4. A teletext decoder for processing raw teletext data stored in a frame buffer of a computer system having a main memory, comprising:

means for transferring the raw teletext data from the frame buffer to a specified location in the main memory; and a raw data processor comprising:

means for specifying the specified location in the main memory;

means for placing the raw teletext data into a first data structure in the main memory; and means for processing the raw teletext data in the first data structure to produce teletext data in a second data structure in the main memory;

wherein the means for placing further comprises:

means for receiving the raw teletext data from the means for transferring;

means for parsing the raw teletext data to find valid teletext data; and means for instructing the means for transferring to transfer only the valid teletext data.

5. A teletext decoder for processing raw teletext data stored in a frame buffer of a computer system having a main memory, comprising:

means for transferring the raw teletext data from the frame buffer to a specified location in the main memory; and a raw data processor, comprising:
   means for specifying the specified location in the main memory;
   means for placing the raw teletext data into a first data structure in the main memory; and
   means for processing the raw teletext data in the first data structure to produce teletext data in a second data structure in the main memory;
   wherein the means for processing further comprises:
      means for synchronizing the raw teletext data to produce teletext data;
      means for verifying the teletext data; and
      means for building the second data structure containing the teletext data in the main memory.

6. The teletext decoder of claim 5, wherein the means for synchronizing further comprises:
   means for determining a sampling threshold for the raw teletext data;
   means for determining a frequency of a clock run in of the raw teletext data by using the sampling threshold; and
   means for determining a phase of the clock run in.

7. The teletext decoder of claim 5, wherein the means for verifying comprises:
   means for verifying a framing code of the teletext data;
   means for verifying a Hamming code of the teletext data; and
   means for verifying a parity of the teletext data.

8. The teletext decoder of claim 5, wherein the means for building comprises:
   means for validating the teletext data;
   means for converting the teletext data into text characters and control codes; and
   means for placing the text characters and control codes into the second data structure in the main memory.

9. A method of processing raw teletext data stored in a frame buffer of a computer system having a main memory, comprising the steps of:
   specifying a location in the main memory;
   transferring the raw teletext data from the frame buffer to the specified location in the main memory;
   placing the raw teletext data into a first data structure in the main memory; and
   processing the raw teletext data in the first data structure to produce teletext data in a second data structure in the main memory;
   wherein the specifying step further comprises the steps of:
      setting up the first data structure in the main memory; and
      creating a pointer to the first data structure.

10. A method of processing raw teletext data stored in a frame buffer of a computer system having a main memory, comprising the steps of:
   specifying a location in the main memory;
   transferring the raw teletext data from the frame buffer to the specified location in the main memory;
   placing the raw teletext data into a first data structure in the main memory; and
   processing the raw teletext data in the first data structure to produce teletext data in a second data structure in the main memory;
   wherein the raw teletext data is stored in a plurality of fields in the frame buffer and the transferring step further comprises the steps of:
      determining a field ID identifying a first video field;
      transferring the raw teletext data in a second video field opposite the first video field to the main memory; and
      signaling that the transfer of the raw teletext data is complete.

11. A method of processing raw teletext data stored in a frame buffer of a computer system having a main memory, comprising the steps of:
   specifying a location in the main memory;
   transferring the raw teletext data from the frame buffer to the specified location in the main memory;
   placing the raw teletext data into a first data structure in the main memory; and
   processing the raw teletext data in the first data structure to produce teletext data in a second data structure in the main memory;
   wherein the first data structure is a circular buffer.

12. A method of processing raw teletext data stored in a frame buffer of a computer system having a main memory, comprising the steps of:
   specifying a location in the main memory;
   transferring the raw teletext data from the frame buffer to the specified location in the main memory;
   placing the raw teletext data into a first data structure in the main memory; and
   processing the raw teletext data in the first data structure to produce teletext data in a second data structure in the main memory;
   wherein the placing step further comprises the steps of:
      receiving the raw teletext data from an interrupt service routine;
      parsing the raw teletext data to find valid teletext data; and
      instructing the interrupt service routine to transfer only the valid teletext data.

13. A method of processing raw teletext data stored in a frame buffer of a computer system having a main memory, comprising the steps of:
   specifying a location in the main memory;
   transferring the raw teletext data from the frame buffer to the specified location in the main memory;
   placing the raw teletext data into a first data structure in the main memory; and
   processing the raw teletext data in the first data structure to produce teletext data in a second data structure in the main memory;
   wherein the processing step further comprises the steps of:
      synchronizing the raw teletext data to produce teletext data;
      verifying the teletext data; and
      building the second data structure containing the teletext data in the main memory.

14. The method of claim 13, wherein the synchronizing step further comprises the steps of:
   determining a sampling threshold for the raw teletext data;
   determining a frequency of a clock run in of the raw teletext data by using the sampling threshold; and
   determining a phase of the clock run in.

15. The method of claim 13, wherein the verifying step further comprises the steps of:
   verifying a framing code of the teletext data;
   verifying a Hamming code of the teletext data; and
   verifying a parity of the teletext data.

16. The method of claim 13, wherein the building step further comprises the steps of:
   validating the teletext data;
   converting the teletext data into text characters and control codes; and
   placing the text characters and control codes into the second data structure in the main memory.

17. A computer program product having a computer readable medium having computer program logic recorded thereon for processing raw teletext data stored in a frame buffer of a computer system having a main memory, the computer program product comprising:
   means for transferring the raw teletext data from the frame buffer to a specified location in the main memory; and
   a raw data processor, comprising:
      means for specifying the specified location in the main memory;
      means for placing the raw teletext data into a first data structure in the main memory; and
      means for processing the raw teletext data in the first data structure to produce teletext data in a second data structure in the main memory.

18. The computer program product of claim 17, wherein the computer system has a teletext display processor and the computer program product further comprises:
   means for sending the second data structure to the teletext display processor.

19. The computer program product of claim 17, wherein the raw teletext data is stored in a plurality of fields in the frame buffer and wherein the means for transferring comprises:
   means for determining a field ID identifying a first video field;
   means for transferring the raw teletext data in a second video field opposite the first video field to the main memory; and
   means for sending the raw data processor a signal indicating that the transfer of the raw teletext data is complete.

20. The computer program product of claim 17, wherein the first data structure is a circular buffer.

21. The computer program product of claim 17, wherein the second data structure is a page data structure.

22. The computer program product of claim 17, wherein the means for specifying further comprises:
   means for setting up the first data structure in the main memory; and
   means for passing a pointer to the first data structure to the means for transferring.

23. The computer program product of claim 17, wherein the means for placing further comprises:
   means for receiving the raw teletext data from the means for transferring;
   means for parsing the raw teletext data to find valid teletext data; and
   means for instructing the means for transferring to transfer only the valid teletext data.

24. The computer program product of claim 17, wherein the means for processing further comprises:
   means for synchronizing the raw teletext data to produce teletext data;
   means for verifying the teletext data; and
   means for building the second data structure containing the teletext data in the main memory.

25. The computer program product of claim 24, wherein the means for synchronizing further comprises:
   means for determining a sampling threshold for the raw teletext data;
   means for determining a frequency of a clock run in of the raw teletext data by using the sampling threshold; and
   means for determining a phase of the clock run in.

26. The computer program product of claim 24, wherein the means for verifying comprises:
   means for verifying a framing code of the teletext data;
   means for verifying a Hamming code of the teletext data; and
   means for verifying a parity of the teletext data.

27. The computer program product of claim 24, wherein the means for building comprises:
   means for validating the teletext data;
   means for converting the teletext data into text characters and control codes; and
   means for placing the text characters and control codes into the second data structure in the main memory.

* * * * *